(No Model.)
G. B. SICCARDI.
CAR BRAKE AND STARTER.
No. 364,310. Patented June 7, 1887.
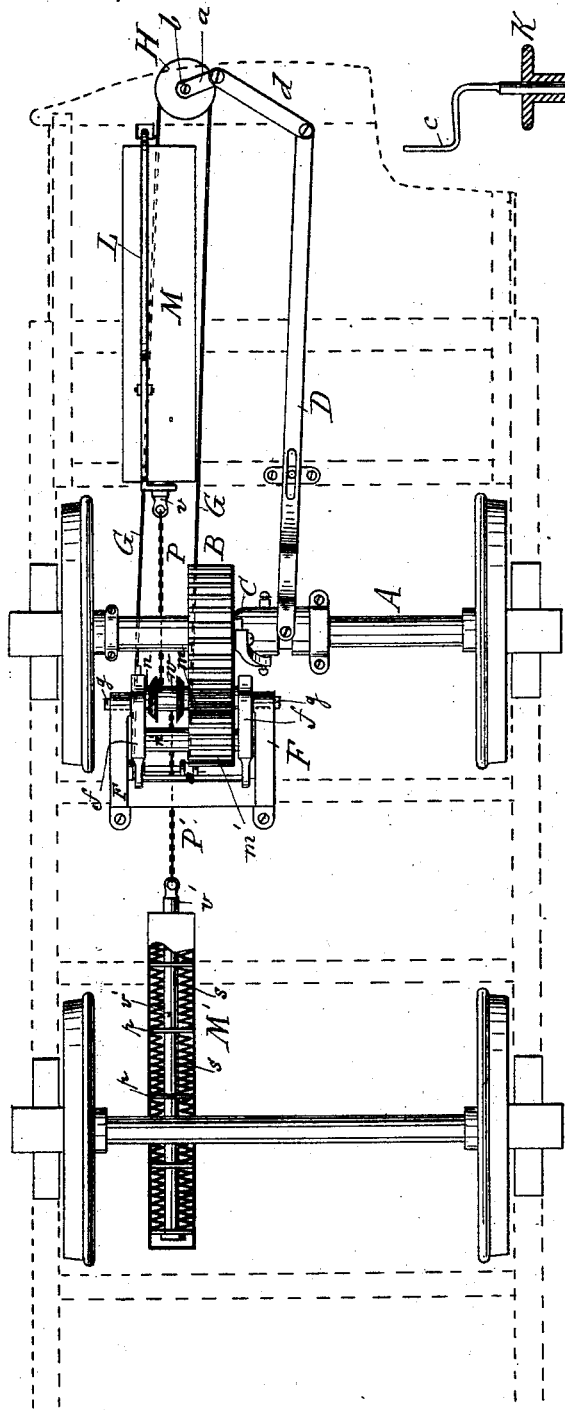
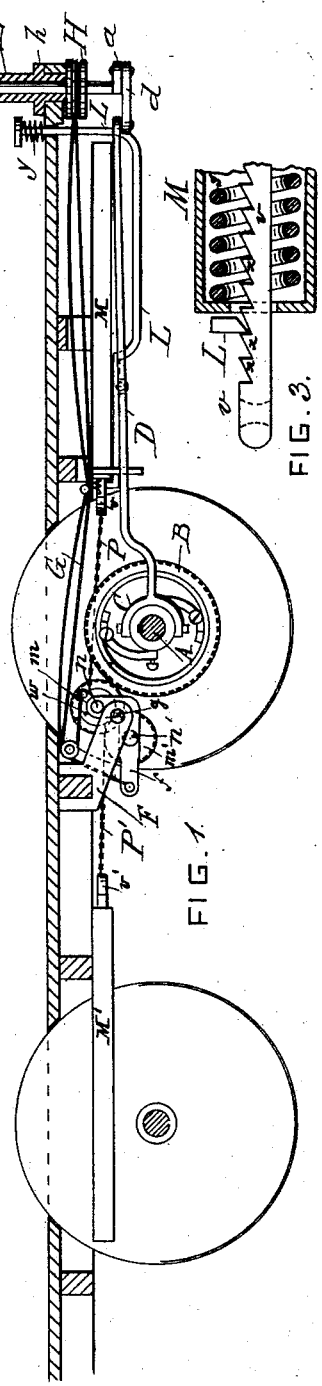
WITNESSES
Wm A Lowe
Alfred Joughman
INVENTOR
Giovanni B. Siccardi
per Roeder & Bristow
Attorneys.

UNITED STATES PATENT OFFICE.

GIOVANNI B. SICCARDI, OF NEW YORK, N. Y.

CAR BRAKE AND STARTER.

SPECIFICATION forming part of Letters Patent No. 364,310, dated June 7, 1887.

Application filed November 9, 1886. Serial No. 218,379. (No model.)

*To all whom it may concern:*

Be it known that I, GIOVANNI B. SICCARDI, a citizen of the United States, residing at New York, in the county and State of New York, have invented a new and useful Improvement in Car Brakes and Starters, of which the following is a specification.

In the accompanying drawings, Figure 1 represents a longitudinal section of a horse car with side view of a brake and starter attached to one of the axles, and Fig. 2 is a plan of the brake and starter. Fig. 3 represents part of the apparatus in detail at an enlarged view, referred to hereinafter.

Upon the axle A a gear-wheel, B, is arranged, capable of turning freely upon said axle, and provided with an internal clutch, C, sliding upon a key or feather attached to the axle. By moving this clutch inward or outward the wheel B will be fastened to the axle A or left free to move independent of the axle. This clutch C is operated by the lever D, connected through rod $d$ with a crank, $a$, attached to an upright shaft, $b$, passing through the shaft E, and provided with a crank, $c$, or hand-wheel at its upper end for operating the same.

Behind the axle A a frame, F, is firmly attached to the under side of the car, supporting double-armed frames $f f$, turning on centers $g$ in frame F. The ends of each arm of the frames $f$ are connected through cords or chains G with a drum, H, attached to the under side of the upright shaft, E, arranged in the usual manner on the platform at the ends of the car and operated by a hand-wheel, K. Near the lower end of the shaft E a ratchet-wheel, $h$, is arranged, into which a pawl (not shown in the drawings) is made to work, operated by the foot of the driver in the usual manner, for the purpose of holding this shaft E in any position. By turning this shaft E in one or the other direction the upper or lower arms of the frames $f$ will be moved toward the wheel B. The arms of the frames $f$ support shafts $n$ and $n'$, turning freely in said arms. The shaft $n$ carries a pinion, $m$, as well as a drum, $w$, and the shaft $n'$ carries a pinion, $m'$. The pinions $m$ and $m'$ work into each other, and the same are so arranged that by the moving of the frames $f$ either one or the other of said pinions will be made to mesh into the wheel B.

M M' are boxes attached to the under side of the car containing spiral springs compressed by the action of central rods, $v v'$. I prefer to arrange these springs, as shown, in box M', (shown in section in Fig. 2,) by combining a number of small spiral springs, $s$, separated by plates $p$, the end plate of which is connected with the rod $v'$, and the number and power of these springs in the box M, I prefer to make greater than those in the box M'. The rods $v v'$ are connected by suitable cords or chains, P P', with the drum $w$, fast on the shaft $n$, in such a manner that the tension of the springs in both cases operates in the same direction upon said drum or shaft. The upper surface of the rod $v$ is provided with teeth $x$, into which the end of a hinged lever, L, works. These teeth are shaped in such a manner that during the outward movement of said rod $v$ the end of this lever L will easily slide over the same, falling in after each tooth, so as to prevent the action of the spring to move the rod inward, except when the lever L is moved away from the same. (See Fig. 3.) The other end of this lever is bent and passes upward through the platform of the car, and is held in that position by the action of a spring, $y$, Fig. 2.

The operation is as follows: During the forward motion of the car the driver turns the shaft E, so as to move thereby the pinion $m'$ into gear with the wheel B, then locking the shaft E by means of the pawl and ratchet-wheel $h$ in the usual manner by the action of his foot. Whenever the driver wishes to stop the car he connects the clutch C with the wheel B by turning the shaft $b$, which, as before mentioned, moves this clutch C through crank $a$, rod $d$, and lever D, causing thereby the wheel B to be connected to the shaft A, and thus communicating motion through pinions $m'$ and $m$ to the drum $w$, when the chains P P' will be wound around said drum $w$, pulling the rods $v v'$ outward, and thus compressing the springs $s$ in the cases M M' until the tension of the springs will overcome the motion of the car and stop the revolution of the axle A. The end of the rod L lies against one of the teeth $x$ of the rod $v$, and consequently holds the same in whatever position the action of the drum $w$ has moved the rod. During the time the car stops, the driver changes the position of the pinions $m'$ and $m$ by turning the shaft E so that the pinion $m$ will mesh into the teeth of the wheel B. This operation can easily be performed, as the springs in the cases M M' are locked in their compressed position by the operation of the lever L, as before described. During the action of stopping the car the wheel B has turned the drum $w$ so as to wind the chains P P' around the circumference of the latter, and has drawn out the rods $v$ $v'$ and compressed the springs $s$. By changing the position of pinions $m'$ $m$ so as to bring the pinion $m$ in gear with the wheel B, the action of the drum $w$ (whenever the springs are left free to expand) will cause the wheel B and axle A to turn in a direction to move the car forward.

When the driver desires to start the car, he presses with his foot upon the end of the lever L, which projects through the platform, moving thereby the other end of said lever clear of the teeth $x$ on the rod $v$, when the action of the springs (now at liberty) will operate the drum $w$, causing the same to turn the axle A and start the car in the manner above described. As soon as the car has been started, the driver disengages the clutch C from the wheel B, thus leaving the car at liberty to be propelled by the horses.

What I claim is—

1. In combination with the axle A of a car, loose wheel B, and clutch C, the pivoted frames $ff$, carrying pinions $m'$ $m$, and drum $w$, connected with springs $s$, and the locking mechanism $v$ L, arranged to operate in the manner and for the purpose described.

2. In combination with the rod $v$, operating the springs $s$ and provided with teeth $x$, the lever L, one end of which engages with said teeth $x$ and the other end of which extends through the platform of the car, arranged to operate in the manner and for the purpose substantially as set forth.

GIOVANNI B. SICCARDI.

Witnesses:
F. V. BRIESEN,
HENRY E. ROEDER.